(12) United States Patent
Pao (10) Patent No.: US 8,201,382 B1
(45) Date of Patent: *Jun. 19, 2012

(54) BUILDING INTEGRATED THERMAL ELECTRIC HYBRID ROOFING SYSTEM

(76) Inventor: Frank Pao, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/976,326

(22) Filed: Dec. 22, 2010

(51) Int. Cl.
 E04B 1/00 (2006.01)
 E04B 7/02 (2006.01)
 E04H 14/00 (2006.01)
(52) U.S. Cl. .................. 52/747.1; 52/90.1; 52/173.3
(58) Field of Classification Search .............. 52/90.1, 52/173.3
See application file for complete search history.

(56) References Cited

U.S. PATENT DOCUMENTS

| | | |
|---|---|---|
| 4,014,152 A | 3/1977 | Vallee |
| 4,033,081 A | 7/1977 | Perkins |
| 4,058,950 A | 11/1977 | Vallee |
| 4,089,145 A | 5/1978 | DeVries, Jr. |
| 4,106,253 A | 8/1978 | Aarons |
| 4,174,703 A | 11/1979 | Blakey |
| 4,189,881 A | 2/1980 | Hawley |
| 4,201,193 A | 5/1980 | Ronc |
| 4,202,319 A | 5/1980 | Vinz |
| 4,204,520 A | 5/1980 | Rosenberg |
| 4,228,791 A | 10/1980 | Hirai |
| 4,426,823 A | 1/1984 | Kobe |
| 4,470,406 A | 9/1984 | Rinklake |
| 4,738,247 A | 4/1988 | Moore |
| 4,860,509 A | 8/1989 | Laaly |
| 4,860,511 A | 8/1989 | Weisner |
| 4,958,471 A | 9/1990 | Waddington |
| 5,112,408 A | 5/1992 | Melchior |
| 5,232,518 A | 8/1993 | Nath et al. |
| 5,259,363 A | 11/1993 | Peacock |
| 5,409,549 A | 4/1995 | Mori |
| 5,437,735 A | 8/1995 | Younan et al. |
| 5,460,164 A | 10/1995 | Rekstad |
| 5,471,807 A | 12/1995 | Vasquez |
| 5,590,495 A | 1/1997 | Bressler |
| 5,791,112 A | 8/1998 | Plum |
| 5,794,396 A | 8/1998 | Gibbs |
| 5,990,414 A | 11/1999 | Posnansky |
| 6,000,393 A | 12/1999 | Moore |
| 6,065,255 A | 5/2000 | Stern |
| 6,269,596 B1 | 8/2001 | Ohtsuka |
| 6,295,818 B1 | 10/2001 | Ansley |
| 6,323,478 B1 | 11/2001 | Fujisaki |
| 6,393,796 B1 | 5/2002 | Goettl |
| 6,463,708 B1 | 10/2002 | Anderson |

(Continued)

Primary Examiner — Mark Wendell
(74) Attorney, Agent, or Firm — Michael N. Cohen; Cohen IP Law Group, P.C.

(57) ABSTRACT

A building integrated thermal electric hybrid roofing system is disclosed. The system comprises a plurality of metal battens having a longitudinal channel mounted horizontally onto a plurality of wooden battens, a thermal tubing containing liquid mounted on the longitudinal channels, a plurality of solar electric roof tiles mounted on the plurality of metal battens and connected in series to form a string, an inverter connected to each of the strings, a heat exchanger connected to the thermal tubing, and a pump connected between the thermal tubing and the heat exchanger. The plurality of solar electric roof tiles generates DC electricity from solar energy and the inverter converts the DC electricity to AC electricity to feed to a utility grid. The plurality of metal battens collects the solar energy and converts into thermal energy through running the liquid which is extracted to the heat exchanger resulting in producing domestic hot water.

13 Claims, 7 Drawing Sheets

U.S. PATENT DOCUMENTS

| | | |
|---|---|---|
| 6,498,289 B1 | 12/2002 | Mori |
| 6,606,830 B2 | 8/2003 | Nagao et al. |
| 6,875,914 B2 | 4/2005 | Guha |
| 7,012,188 B2 | 3/2006 | Erling |
| 7,299,591 B2 | 11/2007 | Broatch |
| D600,638 S | 9/2009 | Plaisted et al. |
| 2005/0000172 A1 | 1/2005 | Anderson |
| 2006/0005507 A1 | 1/2006 | Chillington |
| 2006/0124276 A1 | 6/2006 | Curtis |
| 2007/0157963 A1 | 7/2007 | Metten |
| 2008/0083176 A1 | 4/2008 | Barsun |
| 2008/0141999 A1 | 6/2008 | Hanken |
| 2008/0302031 A1 | 12/2008 | Bressler |
| 2009/0223550 A1 | 9/2009 | Curtin |
| 2011/0138710 A1* | 6/2011 | Reisdorf et al. ............ 52/173.3 |

* cited by examiner

BUILDING INTEGRATED THERMAL ELECTRIC HYBRID ROOFING SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to a building integrated electric roofing system, and more particularly to a building integrated thermal electric hybrid roofing system.

DISCUSSION OF RELATED ART

Global warming and its consequences are very global issues all countries are trying to find solutions to. One important way to reduce global warming would be to use alternative or renewable energy, such as, solar energy which is environment friendly and cost effective in the long run than the conventional methods. A properly sized and installed solar thermal energy collection system can be a practical alternative for acquiring some of the energy needs.

Solar panels are used to generate electricity by converting sun's energy into electricity. These solar panels comprise of photovoltaic cells arranged on a flat grid. For example, U.S. Pat. No. 5,990,414 issued to Posnansky on Nov. 23, 1999 discloses a photovoltaic solar roof consisting of roofing elements made of fiber cement upon which solar cells are mounted. Though the photovoltaic solar roof can be laid by a roofer with no electrotechnical expertise, the conversion rate goes down when the ambient temperature on the roof goes 85 degree Fahrenheit or above. Some other examples include U.S. Pat. Nos. 5,437,735, 5,232,518, and 6,065,255 and U.S. Patent Application No. 20070157963 which show a photovoltaic solar roof tile assembly system. These prior art patents could only manage to install 3 to 4 kw systems on the roof.

The sun's energy can be collected in a variety of different ways. One is converting sun's energy into thermal energy to heat things, such as water. U.S. Pat. No. 4,738,247 issued to Moore on Apr. 19, 1988 provides roof installations consisting of an array of interfitting members e.g. tiles, strips, slats or the like which interfit to form a roof covering and a set of heat pipes which run parallel to the plane of the roof. Heat is abstracted from the heat pipes and used directly or indirectly, e.g. via a heat pump apparatus. U.S. Patent Application No. 20080141999 entitled to Hanken on Jun. 19, 2008 provides a solar heating system for mounting under a roof that includes a panel formed of a sheet material and at least one run of tubing held beneath the panel by a plurality of tubing fasteners. The panel assembly facilitates transfer of the trapped heat from the roof and surrounding air into the fluid circulating through the tubing. Such arrangements will not generate sufficient energy to be self sustaining due to less conversion rate and these are not aesthetically pleasing.

U.S. Pat. No. 5,259,363 issued to Peacock on Nov. 9, 1993 teaches a solar roofing panel system for use in residential and commercial buildings employing conventional metal roofing components. The system collects and supplies thermal energy from the sun to heat the interior thereof and also is capable of providing solar generated electricity for powering the normal complement of household appliances. However the system produces thermal and electrical energy, both thermal energy and electrical energy are not produced simultaneously to work in conjunction as well as compensate with each other.

Therefore, there is a need for a thermal electric hybrid roofing system that eliminates the problem of degradation of conversion rate when the ambient temperature on the roof goes beyond 85 degree Fahrenheit. Further, such a device would effectively utilize the sun's energy, would be self sustaining, aesthetically pleasing, and economical. Such a needed device would simultaneously generate thermal energy and electricity and manage to install more than 4 kw systems on the roof. The present invention accomplishes these objectives.

SUMMARY OF THE INVENTION

The present invention is a building integrated thermal electric hybrid roofing system that comprises a plurality of metal battens mounted horizontally onto a plurality of wooden battens that is mounted vertically across a roof. Each of the plurality of metal battens includes a longitudinal channel that extends in a longitudinal direction on a pair of opposing sides thereof. A thermal tubing containing liquid is mounted on the plurality of metal battens. The thermal tubing extends on the longitudinal channels of each of the plurality of metal battens. A plurality of solar electric roof tiles is further included that is mounted on the plurality of metal battens. The plurality of solar roof tiles is a building integrated photovoltaic roof tile having a solar module that glued to an eternit tile. Each of the plurality of solar electric roof tiles is connected in series to form a string. The present invention further comprises an inverter connected to each of the strings, a heat exchanger connected to the thermal tubing, and a pump connected between the thermal tubing and the heat exchanger for circulating the liquid running through the thermal tubing. The thermal tubing in the present invention may be PEX, brass, copper, or aluminum tubing and liquid running through the thermal tubing may be water or glycol.

The plurality of solar roof tiles generates DC electricity as the solar energy hits a surface of the plurality of solar roof tiles. The inverter converts the DC electricity to AC electricity and feeds to a utility grid. The plurality of metal battens collects the solar energy and converts into thermal energy through running liquid in the thermal tubing throughout the roof. The thermal energy is extracted down to the heat exchanger resulting in heating up the domestic water supply and providing domestic hot water. As the thermal energy is extracted to the heat exchanger, the plurality of solar electric roof tiles is cooled thereby making the plurality of solar electric roof tiles operate at high efficiency in converting the solar energy to DC electricity. In the preferred embodiment, a thermal system and an electric system operate simultaneously to generate domestic hot water and electricity respectively.

Each of the plurality of solar roof tiles is mounted on the plurality of metal battens using a storm anchor hook which is hammered into a hole provided in each of the plurality of metal battens. The metal batten alone holds the thermal tubing along the longitudinal channel thereon and the plurality of solar electric roof tiles.

DETAILED DESCRIPTION OF THE PREFERRED EMBODIMENT

Figure 1:
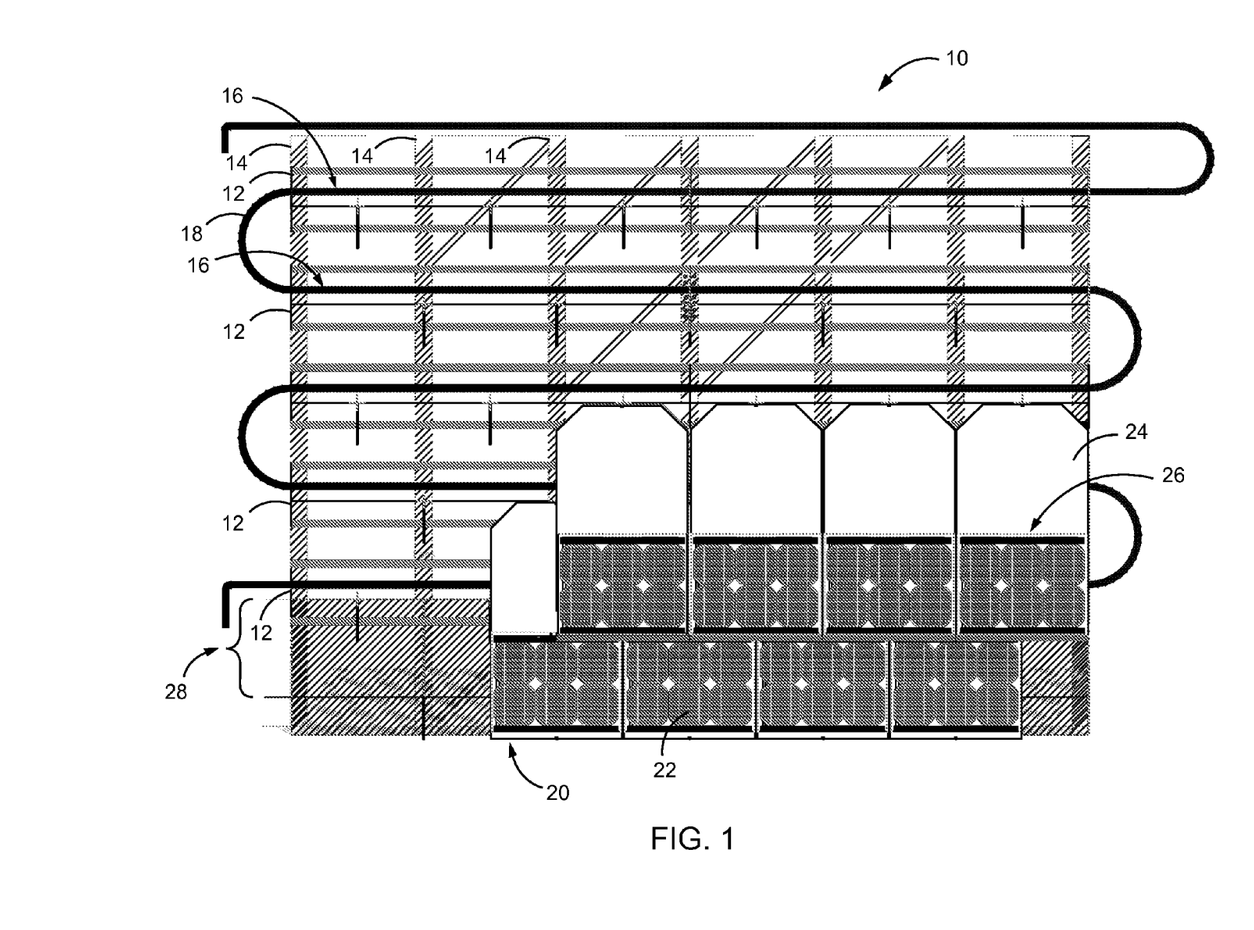
FIG. 1 is a layout of a building integrated thermal electric hybrid roofing system in accordance with the present invention.

FIG. 1 shows a layout of a building integrated thermal electric hybrid roofing system 10 that comprises a plurality of metal battens 12 mounted horizontally onto a plurality of wooden battens 14 that mounted vertically across a roof (not shown). Each of the plurality of metal battens 12 includes a longitudinal channel 16 that extends in a longitudinal direction on opposing sides thereof. A thermal tubing 18 containing liquid is mounted on the plurality of metal battens 12. The thermal tubing 18 extends on the longitudinal channels 16 of each of the plurality of metal battens 12. The system further includes a plurality of solar electric roof tiles 20 mounted on the plurality of metal battens 12. The plurality of solar roof tiles 20 is a building integrated photovoltaic roof tile having a solar module 22 that glued to an eternit tile 24. Each of the plurality of solar electric roof tiles 20 is connected in series to form a string 26. The arrangement of plurality of solar electric roof tiles 20 in the series connection may vary according to the design. As the roof dimensions may vary according to roof design, a starter section 28 is provided that adjusts the string 26 of the plurality solar electric roof tiles 20 accordingly.

Each of the plurality of solar roof tiles 20 is mounted on the plurality of metal battens 12 using a storm anchor hook 29 which is hammered into a hole (not shown) provided in each of the plurality of metal battens 12. The storm anchor hook 29 is designed in such a way that the plurality of solar roof tiles 20 overlaps each other. A plurality of holes (not shown) are drilled in advance on each of the plurality of metal battens 12 according to specified positions which saves time and also simplifies the installation procedures. The specified positions are based on the size of the plurality of solar electric roof tiles 20.

Figure 2:
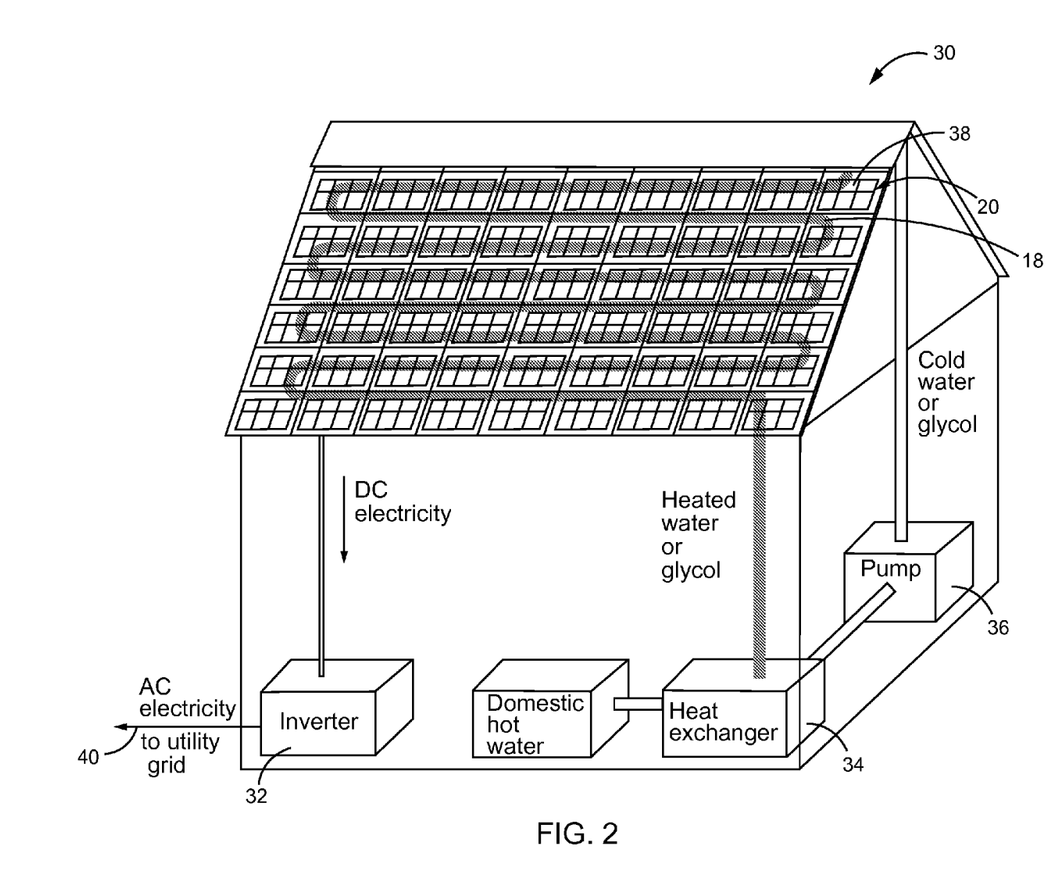
FIG. 2 is an illustration of the building integrated thermal electric hybrid roofing system installed on a house.

FIG. 2 is an illustration of the building integrated thermal electric hybrid roofing system installed on a house 30. In the present invention, a thermal system and an electric system work in conjunction as well as compensate with each other. As shown, the present invention further comprises an inverter 32 connected to each string 26, a heat exchanger 34 connected to the thermal tubing 18, and a pump 36 connected between the thermal tubing 18 and the heat exchanger 34 for circulating the liquid running through the thermal tubing 18. The thermal tubing 18 in the present invention may be PEX, brass, copper, or aluminum tubing and liquid running through the thermal tubing 18 may be water or glycol. Each string 26 can be connected to the inverter 32 or numerous strings can be connected in parallel to the inverter 32 in another embodiment of the invention.

The plurality of solar roof tiles 20 generates DC electricity as the solar energy hits a surface of the plurality of solar roof tiles 20. The inverter 32 converts the DC electricity to AC electricity and feeds to a utility grid 38. With the present invention, it is possible to install up to 7 kw systems on the roof (not shown). The plurality of metal battens 12 collects the solar energy and converts into thermal energy through running the liquid in the thermal tubing 18 throughout the roof (not shown). The thermal energy is extracted down to the heat exchanger 34 resulting in heating up the domestic water supply and providing domestic hot water. As the thermal energy is extracted to the heat exchanger 34, the plurality of solar electric roof tiles 20 is cooled thereby making the plurality of solar electric roof tiles 20 operate at high efficiency in converting the solar energy to DC electricity. Thus the thermal system of the present invention eliminates the problem of degradation of conversion rate of solar energy to electric energy when the ambient temperature on the roof (not shown) goes beyond 85 degree Fahrenheit. Moreover, as the building integrated thermal electric hybrid roofing system 10 captures more solar energy, the system 10 has much high energy conversion rate thereby reducing HVAC power consumption. In the preferred embodiment, the thermal system and the electric system operate simultaneously to generate domestic hot water and electricity respectively. With the present system, the roof (not shown) becomes aesthetically attractive as the thermal part is not exposed to the exterior.

Figure 3:
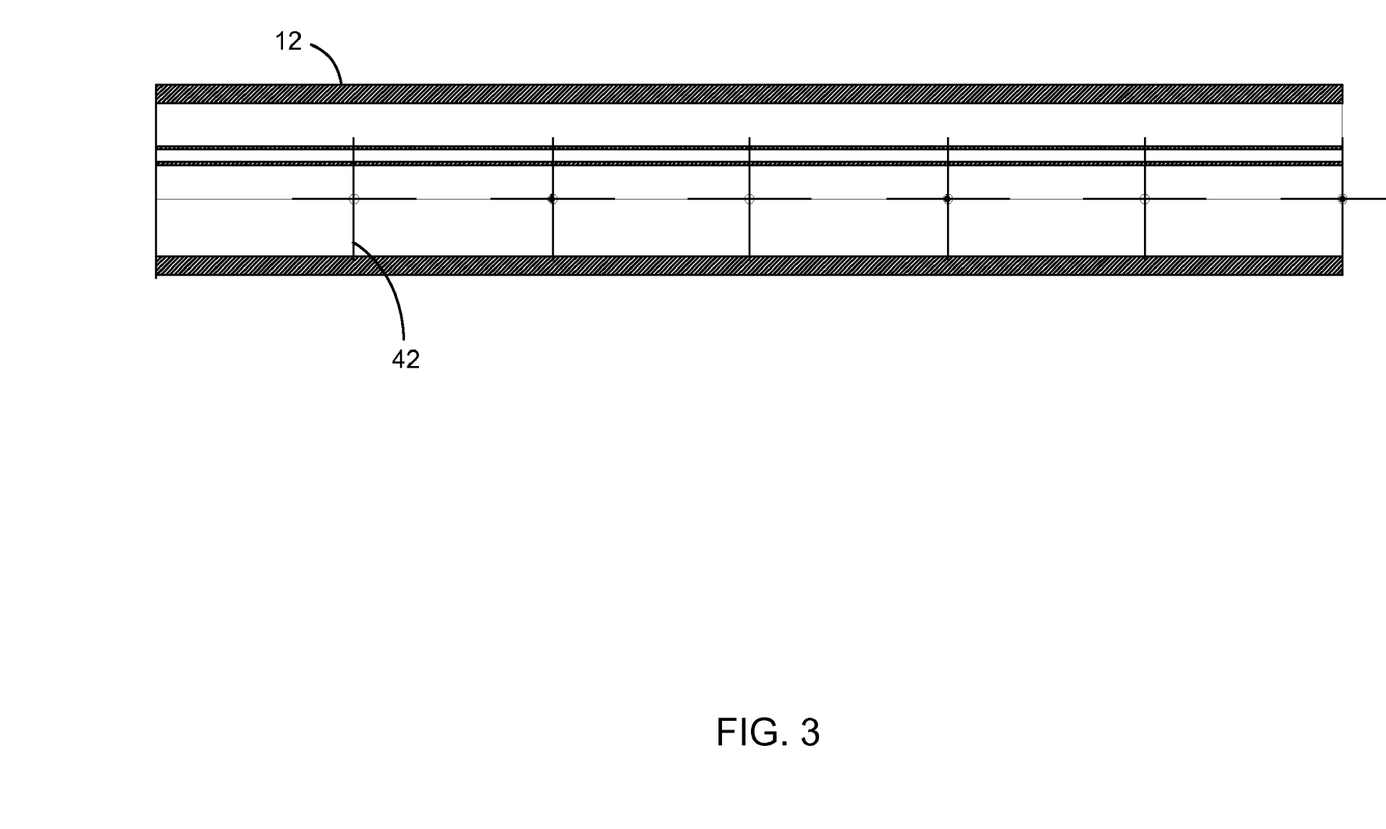
FIG. 3 is a layout of a metal batten of the present invention, illustrating a longitudinal channel.

FIG. 3 shows a layout of the plurality of metal battens 12 utilized in the present invention. Each of the plurality of metal battens 12 includes the longitudinal channel 16 that extends in the longitudinal direction on the opposing sides thereof. The plurality of metal battens 12 is mounted horizontally onto the plurality of wooden battens 14 that mounted vertically across a roof (not shown). The thermal tubing 18 is extended along the longitudinal channel 16 in the longitudinal direction and mounted to the plurality of metal battens 12. Thus, the metal batten 12 alone holds the thermal tubing 18 and the plurality of solar electric roof tiles 20.

The spacing between the each of the plurality of metal battens 12 can be varied subject to the size of the plurality of solar electric roof tiles 20 and the required thermal specification. As the plurality of metal battens 12 are more tightly spaced, more thermal tubing 18 can be installed to achieve high thermo energy conversion efficiency. The main applications of the building integrated thermal electric hybrid roofing system 10 would be on both commercial and domestic slope roofs. However, the system could also be applied on curtain walls or facades on buildings. Yet another embodiment of the invention provides a stand alone system where the electric system alone can charge a plurality of batteries (not shown) by configuring the plurality of solar electric roof tiles 20 at 12, 24, and 48 volt strings.

Figure 4:
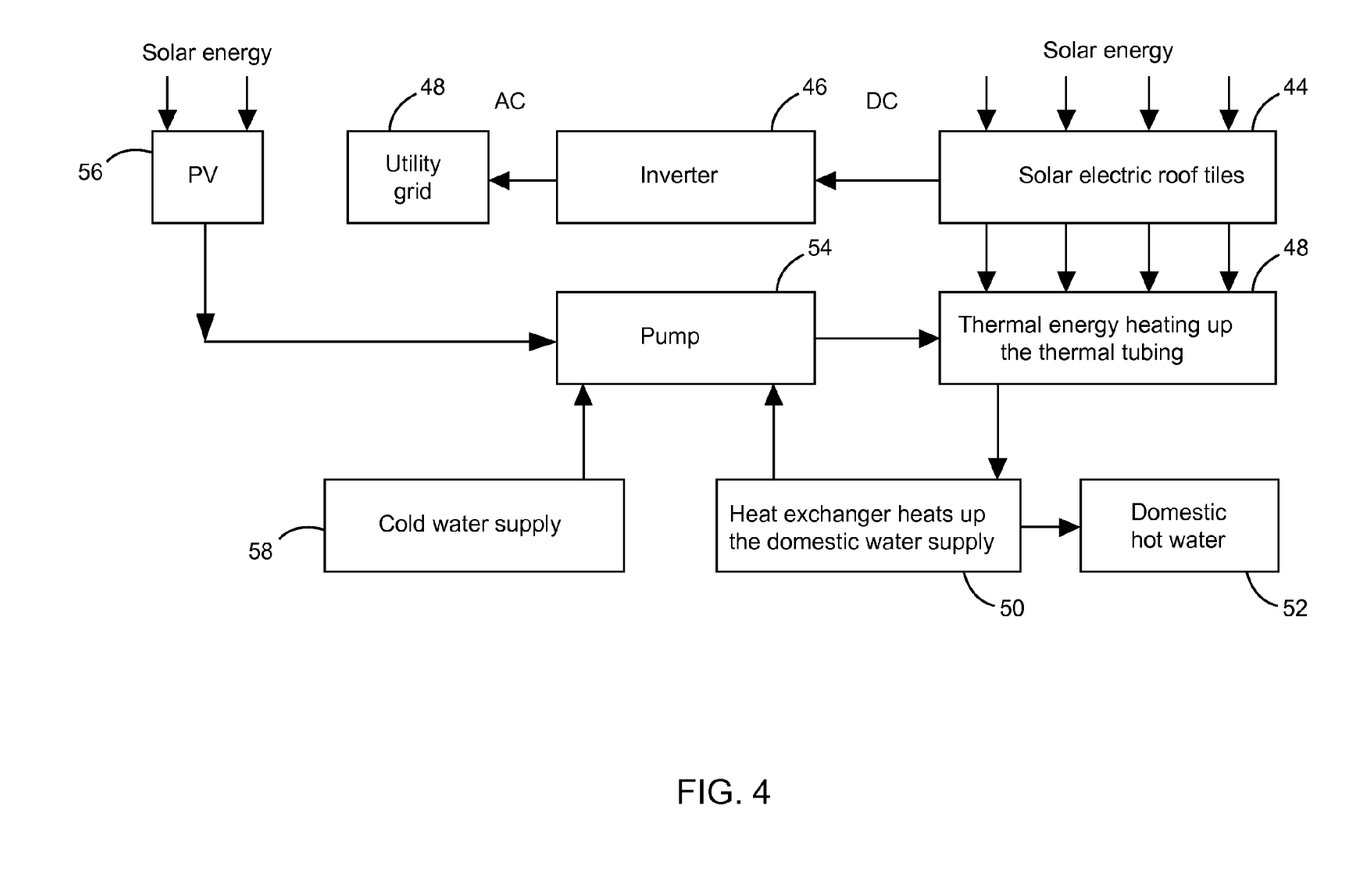
FIG. 4 is a block diagram of the building integrated thermal electric hybrid roofing system in accordance with the present invention.

FIG. 4 is a block diagram of the building integrated thermal electric hybrid roofing system. As the solar energy hits a surface of the plurality of solar roof tiles, the plurality of solar roof tiles generates DC electricity as indicated at block 40. The inverter converts the DC electricity to AC electricity as indicated at block 42 and feeds to a utility grid as indicated at block 44. The plurality of metal battens converts the solar energy into thermal energy thereby heating up the thermal tubing as indicated at block 46. The thermal tubing extracts the thermal energy down to the heat exchanger resulting in heating up the domestic water supply as indicated at block 48 thereby resulting in providing domestic hot water as indicated at block 50. The pump connected between the thermal tubing and the heat exchanger circulates the liquid through the thermal tubing as indicated at block 52. In addition, a separate photovoltaic module as indicated at block 54 and cold water supply as indicated at block 56 can be attached to the pump for an independent working of the thermal system in case there are technical problems in the electric system which could prevent the thermal system from operating. Another advantage of using the separate photovoltaic module indicated at block 54 is that the liquid flowing through the thermal tubing could vary according to the intensity of the solar energy which results in extracting more heat. If more heat is extracted from the roof, the attic cools off thereby generating more domestic hot water and cooling off the plurality of solar electric roof tiles and reduces the air conditioning load.

Figure 5:
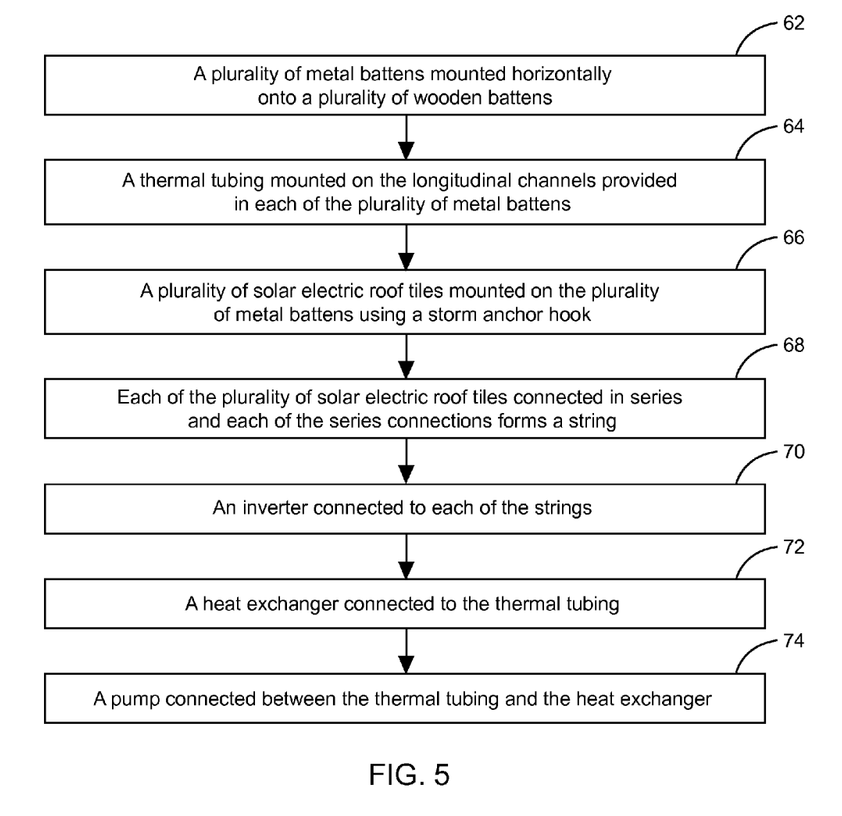
FIG. 5 is a flow chart illustrating a method of mounting the building integrated thermal electric hybrid roofing system.

FIG. 5 is a flow chart for a method of mounting a building integrated thermal electric hybrid roofing system. As shown in step 62 a plurality of metal battens are mounted horizontally onto a plurality of wooden battens. A thermal tubing system is mounted on the longitudinal channels provided in each of the plurality of metal battens as shown in step 64. A plurality of solar electric roof tiles is mounted on the plurality of metal battens using a storm anchor hook as shown in step 66. Each of the plurality of solar electric roof tiles is connected in series and each of the series connections forms a string as shown in step 68. As shown in step 70, an inverter is connected to each of the strings. As shown in step 72, a heat exchanger is connected to the thermal tubing. A pump is connected between the thermal tubing and the heat exchanger as shown in step 74.

Figure 6:
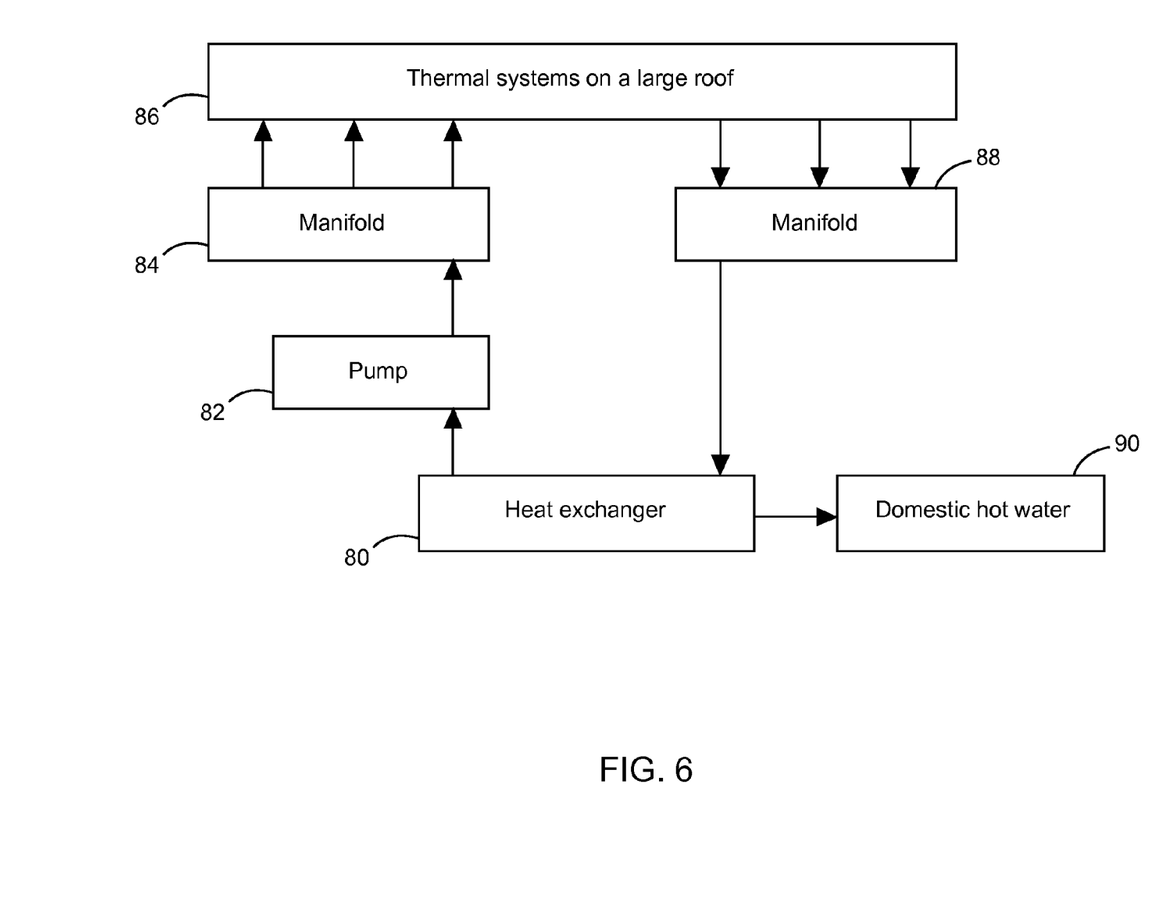
FIG. 6 is a block diagram of a thermal system on a large roof provided with another embodiment of the present invention.

Referring to FIG. 6, another embodiment of the present invention may include a number of loops of the thermal tubing going through the roof. On large roofs situations, the resistance of the liquid increases as the thermal tubing gets longer which results in building up pressure on flow. A number of loops of thermal tubing going through the roofs reduce the pressure on flow. As shown in the block diagram of the thermal system on a large roof, liquid from the heat exchanger as shown in block 80 is pumped as shown in block 82 through a manifold as shown in block 84 to at least three different loops of the thermal system as shown in block 86. The liquid circulating through the loops extracts the thermal solar energy from the roof and then goes through another manifold as shown in block 88 to the heat exchanger as shown in block 80 thereby generating the domestic hot water as shown in block 90.

Figure 7:
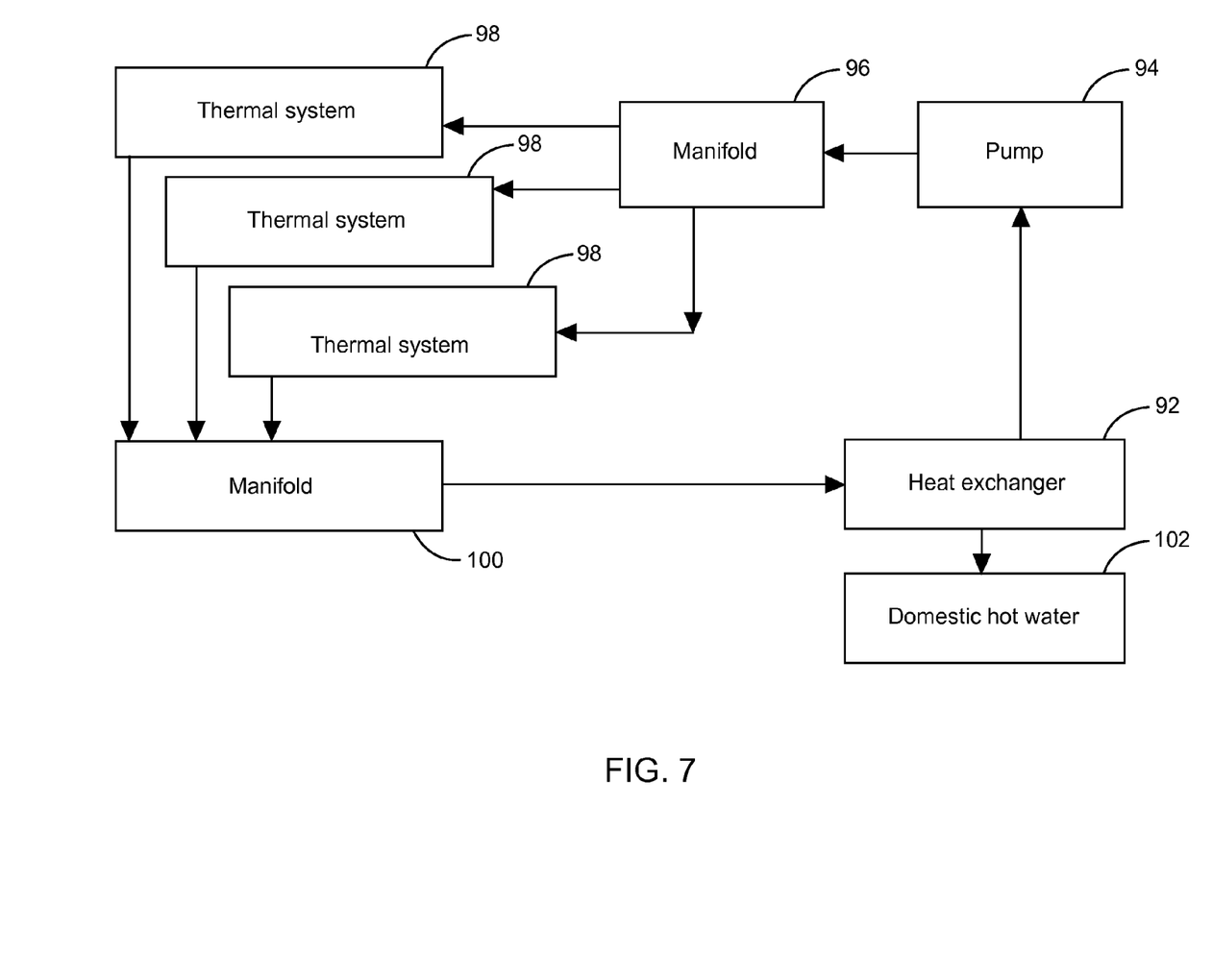
FIG. 7 is a block diagram of a thermal system on a large roof with multiple roof plains provided with another embodiment of the present invention.

Still another embodiment of the invention may include a thermal system on a large roof with multiple roof plains shown in FIG. 7. In a large house with multiple roof plains, the solar energy intensity varies on each roof plain. Since the variation of the solar energy intensity affects the flow rate and pressure of the liquid in different roof plains, multiple thermal systems are used to accommodate multiple roof plains. The liquid from the heat exchanger as shown in block 92 is pumped as shown in block 94 through a manifold as shown in block 96 to multiple thermal systems as shown in block 98. The liquid circulating through the multiple thermal systems as shown in block 98 extracts the thermal solar energy from the roof and then goes through another manifold as shown in block 100 to the heat exchanger as shown in block 92 thereby generating the domestic hot water as shown in block 102.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A building integrated thermal electric hybrid roofing system, comprising:
a plurality of metal battens mounted horizontally onto a plurality of wooden battens that mounted vertically across a roof, each of the plurality of metal battens including a longitudinal channel that extends in a longitudinal direction on opposing sides thereof; a thermal tubing containing liquid mounted and extending on the longitudinal channels of each of the plurality of metal battens; a plurality of solar electric roof tiles mounted on the plurality of metal battens, each of the plurality of solar electric roof tiles connected in series to form a string; an inverter connected to each string for converting direct current (DC) electricity that is fed from the plurality of solar electric roof tiles to alternating current (AC) electricity; a heat exchanger connected to the thermal tubing; a pump connected between the thermal tubing and the heat exchanger for circulating the liquid through the thermal tubing; and a separate photovoltaic module and a cold water supply operatively connected to said pump for an independent working of the thermal systems; and whereby the thermal tubing and the plurality of solar electric roof tiles operate simultaneously to generate domestic hot water and electricity respectively.

2. The building integrated thermal electric hybrid roofing system of claim 1 wherein the plurality of solar roof tiles is a building integrated photovoltaic roof tile having a solar module that glued to an eternit tile.

3. The building integrated thermal electric hybrid roofing system of claim 1 wherein each of the plurality of solar roof tiles is mounted on the plurality of metal batten using a storm anchor hook which is hammered into a hole provided in each of the plurality of metal battens.

4. The building integrated thermal electric hybrid roofing system of claim 1 wherein the plurality of solar roof tiles generates DC electricity as the solar energy hits a surface of the plurality of solar roof tiles.

5. The building integrated thermal electric hybrid roofing system of claim 1 wherein the inverter converts the DC electricity to AC electricity and feeds to a utility grid.

6. The building integrated thermal electric hybrid roofing system of claim 1 wherein the plurality of metal battens collects the solar energy and converts into thermal energy through running the liquid in the thermal tubing throughout the roof.

7. The building integrated thermal electric hybrid roofing system of claim 6 wherein the thermal energy is extracted to the heat exchanger resulting in heating up the domestic water supply and providing domestic hot water.

8. The building integrated thermal electric hybrid roofing system of claim 7 wherein as the thermal energy is extracted to the heat exchanger, the plurality of solar electric roof tiles is cooled thereby making the plurality of solar electric roof tiles operate at high efficiency in converting the solar energy to DC electricity.

9. A method of mounting a building integrated thermal electric hybrid roofing system, comprising:
   a. mounting a plurality of metal battens horizontally onto a plurality of wooden battens that is mounted vertically across a roof, each of the plurality of metal battens includes a longitudinal channel that extends in a longitudinal direction on a pair of opposing sides thereof;
   b. mounting a thermal tubing containing liquid on the longitudinal channels of each of the plurality of metal battens;
   c. mounting a plurality of solar electric roof tiles on the plurality of metal battens using a storm anchor hook which is hammered into a hole provided in each of the plurality of metal battens;
   d. connecting each of the plurality of solar electric roof tiles in series to form a string;

e. connecting an inverter to each string for converting the DC electricity that fed from the plurality of solar electric roof tiles to AC electricity;
f. connecting a heat exchanger to the thermal tubing for extracting the thermal energy; and
g. connecting a pump between the thermal tubing and the heat exchanger for circulating the liquid running through the thermal tubing;
h. connecting a separate photovoltaic module and a cold water supply operatively connected to said pump for an independent working of the thermal systems.

10. The method of claim 9 wherein the plurality of solar roof tiles is a building integrated photovoltaic roof tile having a solar module that glued to an eternit tile.

11. The method of claim 9 wherein the plurality of solar roof tiles generates DC electricity as the solar energy hits a surface of the plurality of solar roof tiles.

12. The method of claim 9 wherein the thermal energy is extracted to the heat exchanger resulting in heating up the domestic water supply and providing domestic hot water.

13. The method of claim 9 wherein as the thermal energy is extracted to the heat exchanger, the plurality of solar electric roof tiles is cooled thereby making the plurality of solar electric roof tiles operate at high efficiency in converting the solar energy to DC electricity.

* * * * *